United States Patent
Liang et al.

(10) Patent No.: US 12,311,579 B2
(45) Date of Patent: May 27, 2025

(54) METHOD FOR MODIFYING INTERFACE OF CARBON FIBER REINFORCED THERMOPLASTIC RESIN MATRIX COMPOSITE MATERIAL

(71) Applicant: QINGDAO UNIVERSITY OF TECHNOLOGY, Shandong (CN)

(72) Inventors: Sen Liang, Shandong (CN); Fengquan Wang, Shandong (CN); Cheng Tian, Shandong (CN); Long Wu, Shandong (CN)

(73) Assignee: QINGDAO UNIVERSITY OF TECHNOLOGY, Shandong (CN)

( * ) Notice: Subject to any disclaimer, the term of this patent is extended or adjusted under 35 U.S.C. 154(b) by 236 days.

(21) Appl. No.: 18/328,578

(22) Filed: Jun. 2, 2023

(65) Prior Publication Data
US 2024/0246261 A1    Jul. 25, 2024

(30) Foreign Application Priority Data
Jan. 16, 2023 (CN) .......................... 202310066402.0

(51) Int. Cl.
*B29B 15/12* (2006.01)
*B29C 70/44* (2006.01)
(Continued)

(52) U.S. Cl.
CPC .......... *B29B 15/125* (2013.01); *B29C 70/443* (2013.01); *B29K 2033/12* (2013.01); *B29K 2307/04* (2013.01)

(58) Field of Classification Search
CPC ..... B29B 15/08; B29B 15/125; B29C 70/342; B29C 70/443; B32B 27/00; B32B 27/06; B32B 27/12; B32B 27/308; B32B 37/06; B32B 37/10; B32B 37/1009; B32B 5/02; B32B 2260/021; B32B 2260/046;
(Continued)

(56) References Cited

U.S. PATENT DOCUMENTS

2018/0298154 A1* 10/2018 Lundorf ................. C04B 35/48
2023/0191722 A1*  6/2023 Tardy .................. B29C 66/7392

OTHER PUBLICATIONS

Matsuura et al., Polymer Journal 2020 52 (Year: 2020).*

* cited by examiner

Primary Examiner — Yunju Kim
(74) Attorney, Agent, or Firm — Oliff PLC

(57) ABSTRACT

A method with which mechanical properties of the interface of the fiber reinforced thermoplastic resin matrix composite material can be improved by conducting grafting on surfaces of materials. A carbon fiber (CF) and a polymethyl methacrylate resin (PMMA) are subjected to interface modification treatment to introduce active carboxyl groups to the surfaces of the materials. Then, hexamethylene diisocyanate (HDI) is used as a coupling layer for connecting the carboxyl groups on the surfaces of the carbon fiber and on the surfaces of the polymethyl methacrylate resin to form a "molecular bridge". Accordingly, the interface binding force between the resin and the fiber is improved by chemical grafting. A modified carbon fiber reinforced polymethyl methacrylate composite material sample (CF/PMMA) is prepared by a thin film lamination method, and the composite material sample prepared is subjected to a microscopic verification testing of the validity of the method provided in the present disclosure.

8 Claims, 6 Drawing Sheets

(51) Int. Cl.
 *B29K 33/00* (2006.01)
 *B29K 307/04* (2006.01)
(58) Field of Classification Search
 CPC ............... B32B 2262/106; C08J 5/248; B29K 2033/12; B29K 2307/04
 See application file for complete search history.

METHOD FOR MODIFYING INTERFACE OF CARBON FIBER REINFORCED THERMOPLASTIC RESIN MATRIX COMPOSITE MATERIAL

TECHNICAL FIELD

The present disclosure belongs to the field of manufacturing technologies for improving interface properties of composite materials, and particularly relates to a process for modifying an interface of a carbon fiber reinforced thermoplastic resin matrix composite material.

BACKGROUND

As a common material for enhancing the strength of a resin matrix composite material, a carbon fiber has excellent mechanical properties such as high strength, high modulus and low density. Due to a special arrangement manner of a hexagonal atomic structure, the carbon fiber is also endowed with good electrical and thermal conductivity and stable chemical properties. A carbon fiber reinforced thermoplastic or thermosetting resin matrix composite material has been widely used in aerospace, high-speed trains and other fields.

Compared with the thermoplastic resin matrix composite material, the thermosetting resin matrix composite material has the disadvantages of low damage tolerance, long processing cycle and difficult recycling, resulting in limited application fields to a certain extent. The thermoplastic resin matrix composite material has the advantages of high damage tolerance, convenient processing and recycling of waste capable of being melted and formed again, thus becoming a hot spot in the research field of composite materials.

The carbon fiber has a smooth surface and few polar groups, is chemically inert as a whole, and has poor interface bonding ability with a thermoplastic resin matrix. Thus, improvement of the interface binding force between the carbon fiber and the thermoplastic resin matrix has become a key issue in research. A lot of studies have been carried out to improve interface properties of the thermoplastic resin and the carbon fiber, and main methods adopted include surface modification of the carbon fiber, such as electrodeposition, chemical etching, hydrosolvothermal method, sizing method, plasma treatment and other methods. These methods are characterized in that the problem of insufficient interface binding force between the carbon fiber and the thermoplastic resin matrix is not solved fundamentally, and the carbon fiber is likely to be extracted from the resin matrix after a force is applied. As a result, mechanical properties of a reinforced phase are not fully exerted, and the bearing capacity of a whole fiber reinforced thermoplastic composite material is seriously affected.

SUMMARY

The purposes of the present disclosure are to overcome the shortcomings of the prior art and provide a method for improving mechanical properties of an interface of a carbon fiber reinforced polymethyl methacrylate composite material. That is to say, a carbon fiber and a resin are subjected to bidirectional modification in the present disclosure, and hexamethylene diisocyanate (HDI) is used as an intermediate coupling layer to form a chemical bond connected to the interface between the fiber and the resin, so that the fiber and the resin are grafted into a whole, and an interface bonding property is effectively improved.

In order to realize the above purposes, the present disclosure adopts the following technical process solutions.

A process for improving mechanical properties of an interface of a carbon fiber reinforced polymethyl methacrylate composite material includes:

(1) preparing an acidic potassium permanganate solution, immersing a cleaned carbon fiber in the prepared acidic potassium permanganate solution for soaking for a set time, and taking out the carbon fiber, followed by cleaning, drying, sealing and preservation for later use;

(2) brush-coating a surface of a cleaned polymethyl methacrylate film sheet with tetrahydrofuran, conducting sealing and standing, taking out the film sheet, then soaking the film sheet in a diluted hydrochloric acid solution for a set time, and after the treatment is completed, taking out the film sheet, followed by drying, sealing and preservation for later use;

(3) cutting the treated polymethyl methacrylate film sheet and carbon fiber in appropriate sizes according to the size of a mold;

(4) coating surfaces of the treated and cut fiber and resin film with a layer of hexamethylene diisocyanate, and after uniform coating is completed, conducting laying according to a designed laying sequence to form a preformed body, where outermost layers on the upper and lower surfaces of the preformed body are resin film sheets;

(5) laying a release cloth on the upper and lower surfaces of the preformed body, and then placing the preformed body in a vacuum bag for vacuumization treatment; and (6) placing the vacuumized and treated preformed body of the composite material in a forming mold of a press machine at a set temperature and a set pressure, conducting hot pressing for a set time, taking out the mold, placing the mold on a worktable for cooling, and after cooling to room temperature, opening the release cloth to obtain a modified carbon fiber reinforced polymethyl methacrylate composite material sample.

As a further technical solution, in step (1), the acidic potassium permanganate solution has a mass fraction of 5-30% and is prepared by adding deionized water and an appropriate amount of a mixed solution of diluted hydrochloric acid with a concentration of 0.01-1 mol/L. As a common strong oxidant, potassium permanganate has the strongest oxidation ability under acidic conditions without destroying a surface structure of a material. Under oxidation of the acidic potassium permanganate solution, a carboxyl group appears on the surface of the carbon fiber.

As a further technical solution, in step (1), the soaking process is carried out in an ultrasonic cleaner under a water bath at a temperature of 10-60° C.

As a further technical solution, in step (1), a method for cleaning and drying the carbon fiber includes cleaning the surface of the carbon fiber with deionized water for four times, and placing the cleaned carbon fiber in a preheated oven for drying for 10-50 minutes.

As a further technical solution, in step (2), the purpose of treating the surface of the resin sheet with the tetrahydrofuran is that as the polymethyl methacrylate is capable of being dissolved in the tetrahydrofuran, the film sheet may better undergo a hydrolysis reaction with the hydrochloric acid to produce a polar carboxyl group after the surface is partially dissolved.

As a further technical solution, in step (2), the concentration of the hydrochloric acid solution used is 0.01-1 mol/L.

As a further technical solution, in step (2), the soaking process is carried out in an oven at a temperature of 10-60° C.

As a further technical solution, in step (4), the purpose of using the hexamethylene diisocyanate as an intermediate medium is that as two ends of a hexamethylene diisocyanate molecule have polar —NCO groups which can undergo chemical reactions with carboxyl groups on the fiber and the resin respectively, the two materials are better connected to realize chemical grafting.

The Working Principle of the Present Disclosure is as Follows:

as two ends of a hexamethylene diisocyanate (HDI) molecular chain have polar —NCO groups, HDI is used as an intermediate medium for connecting an interface between a fiber and a resin based on the special molecular structure. After surfaces of the fiber and the resin are modified, —COOH groups are introduced to the surfaces of the materials to react with the polar —NCO groups at the two ends of the HDI, so as to form a chemical bond connected to a bonding interface of a composite material. A chemical reaction formula is as follows:

R—NCO + R'—COOH ⟶ R—NH—COR' + CO$_2$.

The Present Disclosure has the Following Implementation Effects

Different from a traditional thin film lamination method for manufacturing a carbon fiber/polymethyl methacrylate (CF/PMMA) composite material, the present disclosure provides a novel method for improving an interface bonding property of a material. According to the traditional thin film lamination method for manufacturing a CF/PMMA composite material, a resin is simply heated to a melt state and then physically bond to a carbon fiber, so that the interface binding force is low, and as a result, the traditional method cannot be widely used. However, according to the present disclosure, first, a carbon fiber is oxidized by an acidic potassium permanganate solution to introduce a carboxyl group on the surface of the fiber. Second, a part of ester groups on the surface of polymethyl methacrylate are hydrolyzed by tetrahydrofuran and a hydrochloric acid solution to produce a functional resin with a carboxyl group. At last, surfaces of the modified fiber and resin film are coated with hexamethylene diisocyanate, and the carboxyl groups on the resin and the fiber are connected by polar —NCO functional groups (as shown in FIG. 1) at two ends to form a "molecular bridge". Chemical grafting between the resin and the fiber is realized, the CF/PMMA composite material has better interlayer properties, and the practical application range of a fiber reinforced thermoplastic resin matrix composite material is expanded.

DETAILED DESCRIPTION

Figure 1:
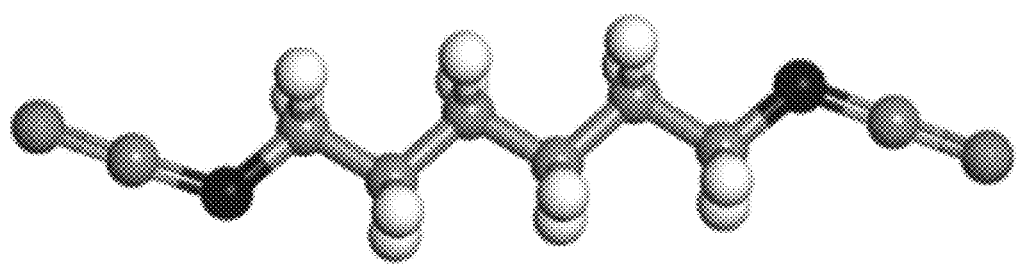
FIG. 1 shows a molecular structure model of HDI.

It should be pointed out that the following detailed descriptions are illustrative and are intended to provide further descriptions of the present disclosure. Unless otherwise indicated, all technical terms and scientific terms used in the present disclosure have the same meaning as those generally understood by a person of ordinary skill in the art to which the present disclosure belongs.

It should be noted that the terms used herein are merely intended to describe specific embodiments, rather than to limit exemplary embodiments of the present disclosure. As used herein, unless otherwise explicitly stated in the present disclosure, a singular form is also intended to include a plural form. Besides, it shall also be understood that the term "comprise" and/or "include" used in this specification is intended to indicate features, steps, operations, devices, components and/or combinations thereof.

This embodiment provides a method for modifying an interface of a carbon fiber reinforced thermoplastic resin matrix composite material, which is a method for improving mechanical properties of the interface of the fiber reinforced thermoplastic resin matrix composite material by conducting grafting on surfaces of materials. A carbon fiber (CF) and a polymethyl methacrylate resin (PMMA) are subjected to surface modification treatment to introduce active carboxyl groups to the surfaces of the materials. Then, hexamethylene diisocyanate (HDI) is used as a coupling layer for connecting the carboxyl groups on the surfaces of the carbon fiber and the polymethyl methacrylate resin to form a "molecular bridge". Accordingly, the interface binding force between the resin and the fiber is improved by chemical grafting. A modified carbon fiber reinforced polymethyl methacrylate composite material sample (CF/PMMA) is prepared by a thin film lamination method, and the composite material sample prepared is subjected to a microscopic verification test to test the validity of the method provided in the present disclosure, so that a foundation is laid for wide application of the fiber reinforced thermoplastic resin matrix composite material. The test specifically includes:

A: subjecting a carbon fiber and polymethyl methacrylate to surface modification treatment, separately, where the purpose of the treatment is to introduce polar carboxyl groups to the surfaces of the resin and the fiber, including:

(1) preparing an appropriate amount of an acidic potassium permanganate solution, immersing a cleaned carbon fiber in the prepared acidic potassium permanganate solution for soaking for 1-5 hours, and taking out the carbon fiber, followed by cleaning, drying, scaling and preservation for later use; and (2) brush-coating a surface of a cleaned polymethyl methacrylate film sheet with a thickness of 0.1-0.5 mm with tetrahydrofuran, conducting sealing and standing for 10-60 minutes, taking out the film sheet, then soaking the film sheet in a diluted hydrochloric acid solution for 1-5 hours, and after the treatment is completed, taking out the film sheet, followed by drying, sealing and preservation for later use;

B: preparing a composite material sample, including:
  (1) cutting the treated polymethyl methacrylate film sheet with a thickness of 0.1-0.5 mm and the carbon fiber in appropriate sizes according to the size of a mold;
  (2) coating the surfaces of the treated and cut fiber and resin film with a layer of hexamethylene diisocyanate, and after uniform coating is completed, conducting laying according to a designed laying sequence to form a preformed body, where outermost layers on the upper and lower surfaces of the preformed body are resin film sheets;
  (3) laying a release cloth on the upper and lower surfaces of the preformed body, and then placing the preformed body in a vacuum bag for vacuumization treatment; and
  (4) placing the vacuumized and treated preformed body of the composite material in a forming mold of a press machine at an operation temperature of 100-250° C. and an operation pressure of 2-20 MPa, conducting hot pressing for 1-3 hours, taking out the mold, placing the mold on a worktable for cooling, and after cooling to room temperature, opening the release cloth to obtain a modified carbon fiber reinforced polymethyl methacrylate composite material sample (CF/PMMA); and C: carrying out a microscopic validation test on the composite material sample prepared by the above method, including:
  (1) analyzing changes of functional groups on the surfaces of the carbon fiber before and after modification, the polymethyl methacrylate before and after modification, the modified carbon fiber after the hexamethylene diisocyanate is introduced, and the modified polymethyl methacrylate after the hexamethylene diisocyanate is introduced, by a Fourier transform infrared spectrometer (FTIR) to determine whether chemical grafting between the resin and the fiber layer is achieved; and carrying out an experiment at an ATR mode in a scanning range of 400-4,000 $cm^{-1}$ at a spectral resolution of 4 $cm^{-1}$, and drawing a diagram based on obtained data; and
  (2) observing the surface morphology of the materials at various treatment stages by field emission scanning electron microscopy, and analyzing changes of a microscopic structure.

A Treatment Method in Step (1) of Step A Includes the Following Conditions:
  a: the acidic potassium permanganate aqueous solution has a mass fraction of 5-30% and is prepared by adding deionized water and an appropriate amount of a mixed solution of diluted hydrochloric acid with a concentration of 0.01-1 mol/L, and as a common strong oxidant, potassium permanganate has the strongest oxidation ability under acidic conditions without destroying a surface structure of a material;
  b: the soaking process is carried out in an ultrasonic cleaner under a water bath at a temperature of 10-60° C.; and
  c: a method for cleaning and drying the carbon fiber includes cleaning the surface of the carbon fiber with deionized water for four times, and placing the cleaned carbon fiber in a preheated oven for drying for 10-50 minutes.

Treatment in Step (2) of Step A Includes the Following Conditions:
  a: as the polymethyl methacrylate is capable of being dissolved in the tetrahydrofuran, the film sheet may better undergo a hydrolysis reaction with the hydrochloric acid to produce a polar carboxyl group after the surface is partially dissolved;
  b: the concentration of the hydrochloric acid solution used is 0.01-1 mol/L; and
  c: the soaking process is carried out in an oven at a temperature of 10-60° C.

In step (2) of step B, the purpose of using the hexamethylene diisocyanate as an intermediate medium is that as two ends of a hexamethylene diisocyanate molecule have polar —NCO groups which can undergo chemical reactions with carboxyl groups on the fiber and the resin respectively, the two materials are better connected to realize chemical grafting. The molecular structure formula of the hexamethylene diisocyanate is as follows:

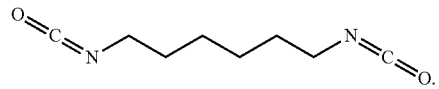 [SMILES: O=C=NCCCCCCN=C=O]

The process flow implemented in the present disclosure is further described below in conjunction with FIG. 1 to FIG. 9 and microscopic test results.

Figure 2:
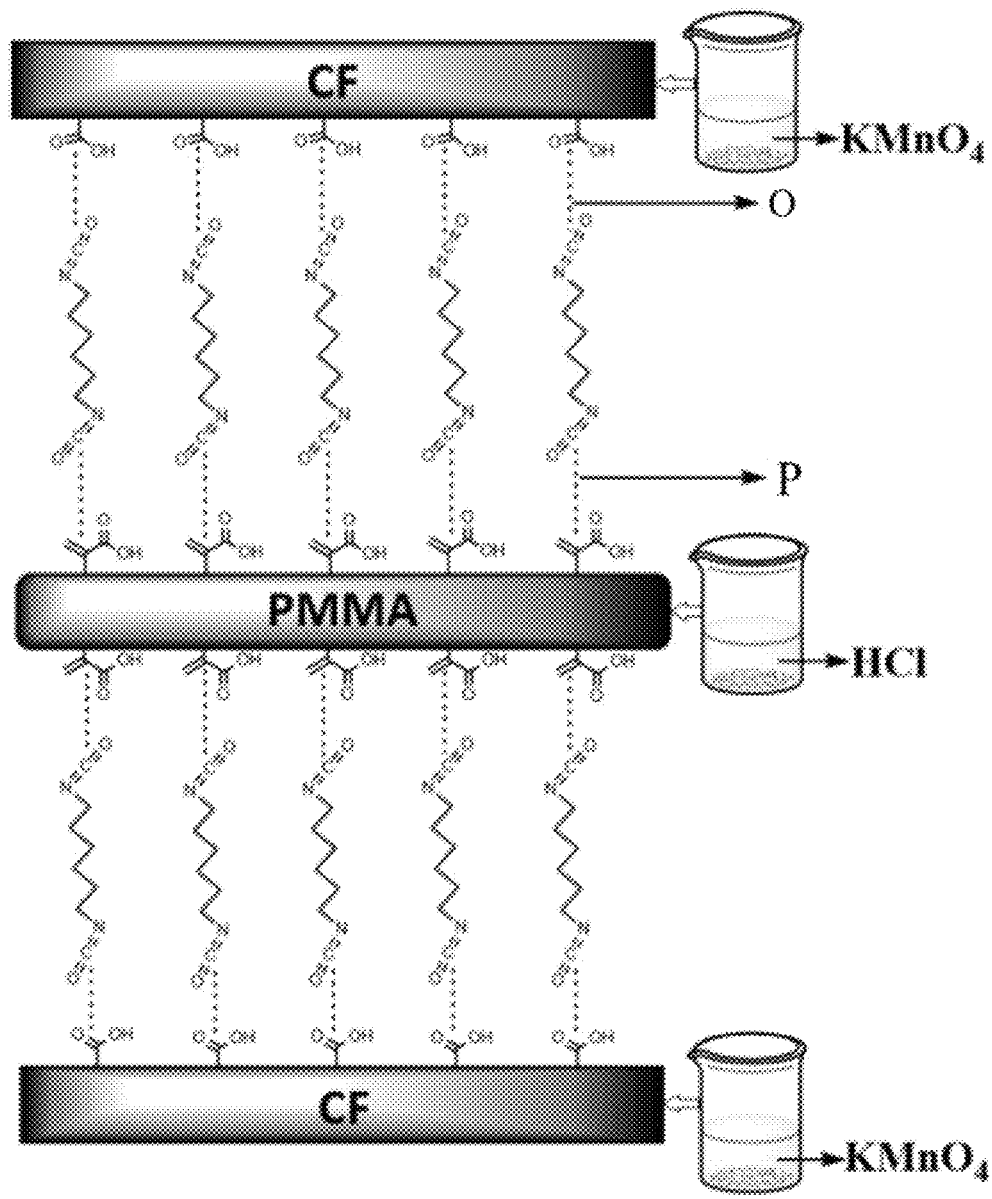
FIG. 2 shows an interlayer grafting principle of HDI with CF/PMMA.

1. Analysis of a Microscopic Principle:

As shown in FIG. 1, as two ends of an HDI molecular chain have polar —NCO groups, HDI is used as an intermediate medium for connecting an interface between a fiber and a resin based on the special molecular structure. As shown in FIG. 2, after surfaces of the fiber and the resin are modified, —COOH groups are introduced to the surfaces of the materials to react with the polar —NCO groups at the two ends of the HDI, so as to form a chemical bond connected between the materials. In FIG. 2, O and P indicate the —NCO group and the —COOH group, respectively, and a chemical reaction occurred is as shown in the following formula:

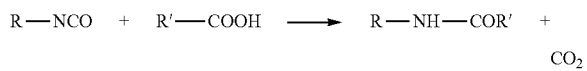

2. Modification and Preparation Process of a Composite Material:

(1) Surface Modification Treatment of CF and PMMA:

A carbon fiber braided cloth is used as a carbon fiber in this implementation process, 1 L of a potassium permanganate aqueous solution with a mass fraction of 20% is prepared, and 10 mL of a mixed solution of diluted hydrochloric acid with a concentration of 0.1 mol/L is added. As a common strong oxidant, potassium permanganate has the strongest oxidation ability under acidic conditions without destroying a surface structure of a material. The prepared acidic potassium permanganate solution is poured into an SEQ-1020B ultrasonic cleaner, the cleaned carbon fiber is immersed in the prepared acidic potassium permanganate solution for ultrasonic soaking under a water bath at a temperature of 40° C. for 4 hours, and the carbon fiber is taken out and cleaned with deionized water, followed by drying in an oven, sealing and preservation for later use.

A cleaned polymethyl methacrylate film sheet with a thickness of 0.2 mm is brush-coated with tetrahydrofuran, sealing and standing are conducted for 30 minutes, the film sheet is taken out, soaked in a diluted hydrochloric acid solution with a concentration of 0.1 mol/L and then placed in an oven at a temperature of 45° C. for 3 hours, and after the treatment is completed, the film sheet is taken out, followed by drying, sealing and preservation for later use.

Figure 3:
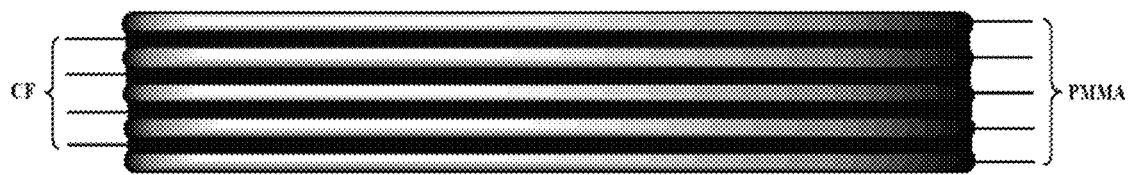
FIG. 3 is a schematic diagram showing a laying sequence of CF and PMMA.

(2) Preparation of a Composite Material:

The treated polymethyl methacrylate film sheet with a thickness of 0.2 mm and the carbon fiber braided cloth are cut into square pieces with a size of 15 cm*15 cm, where the carbon fiber braided cloth is cut into 4 pieces, and the polymethyl methacrylate film sheet is cut into 5 pieces. The surfaces of the cut fiber and resin film are coated with a layer of hexamethylene diisocyanate with a thickness of 0.025 mm. After uniform coating is completed, laying is conducted according to a designed laying sequence to form a preformed body, as shown in FIG. 3.

A release cloth is laid on the upper and lower surfaces of the preformed body, and then the preformed body is placed in a vacuum bag for vacuumization treatment.

The vacuumized and treated preformed body of the composite material is placed in a square hollowed-out mold with the same size, and the forming operation temperature and operation pressure of a press machine are set at 170° C. and 10 MPa, respectively. After the temperature reaches 170° C., the mold is placed for hot pressing for 1 hour. Then, the mold is taken out and placed on a worktable for cooling, and after cooling to room temperature, the release cloth is opened to obtain a carbon fiber reinforced polymethyl methacrylate composite material sample (CF/PMMA).

3. Microscopic Test:

(1) Analysis of FTIR Spectra:

The above invention principle and the realization process can be verified by a microscopic experiment. According to spectra as shown in FIG. 4, specific verification analysis is as follows.

Figure 4A:
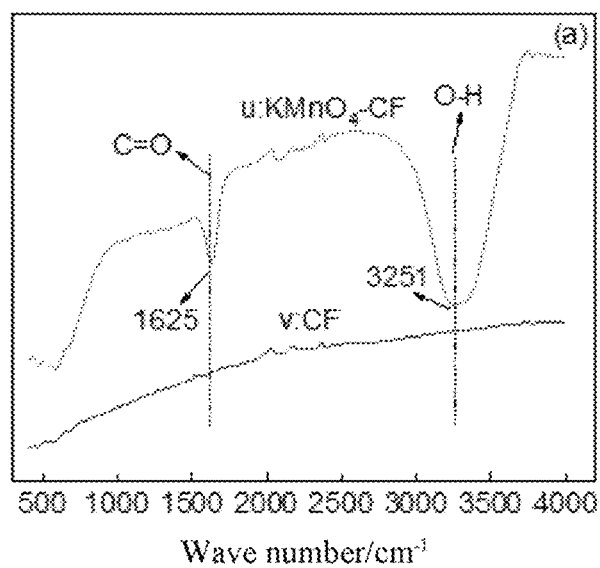
FIGS. 4(A)-4(C) shows FTIR spectra of CF and PMMA at various treatment stages.
Figure 4B:
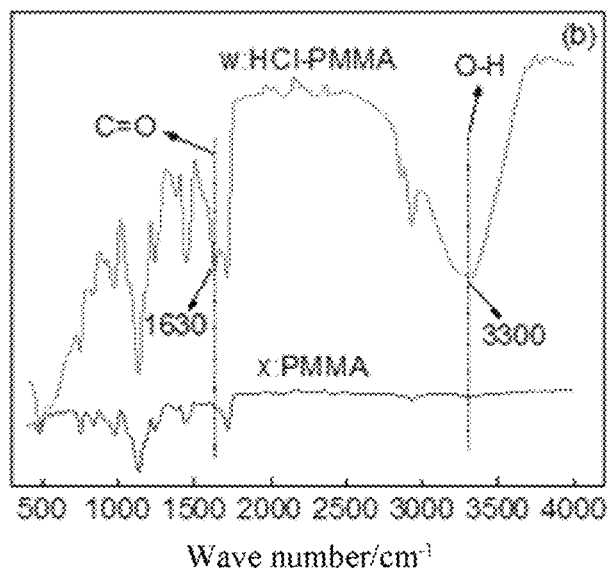
Figure 4C:
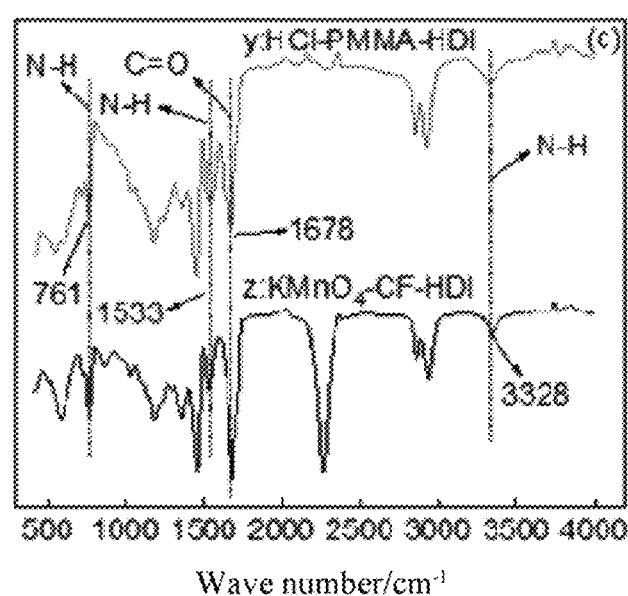

Chemical groups on the surfaces of CF and PMMA at various treatment stages are subjected to a characterization test by FTIR to analyze whether new chemical bonds are produced or not. FIG. 4(a) is a diagram showing infrared spectra of the CF before and after modification with an acidic potassium permanganate solution. FIG. 4(b) is a diagram showing infrared spectra of the PMMA film sheet before and after modification with an HCl solution. FIG. 4(c) is a diagram showing infrared spectra of the CF and the PMMA before and after modification when HDI is introduced. According to a curve u of the spectra in FIG. 4(a), a C=O stretching vibration peak of a carboxyl group appears at 1,625 $cm^{-1}$, and an O—H stretching vibration peak of a carboxyl group appears at 3,251 $cm^{-1}$. Compared with a curve v, it can be inferred that the surface of the CF after oxidation modification with the $KMnO_4$ solution has the carboxyl group. According to a curve w of the spectra in FIG. 4(b), a C=O stretching vibration peak of a carboxyl group appears at 1,630 $cm^{-1}$, and an O—H stretching vibration peak of a carboxyl group appears at 3,300 $cm^{-1}$. Compared with a curve x, it can be inferred that the surface of the PMMA after hydrolysis modification with the HCl solution has the carboxyl group. According to curves y and z of the spectra in FIG. 4(c), an N—H bending vibration peak of an amide group appears at 761 $cm^{-1}$ and 1,533 $cm^{-1}$, a C=O stretching vibration peak of an amide group appears at 1,678 $cm^{-1}$, an N—H stretching vibration peak of an amide group appears at 3,328 $cm^{-1}$, and peaks of the two curves are basically consistent. According to changes of these characteristic peaks, it can be inferred that the HDI has undergone chemical reactions with the modified CF and the modified PMMA to form a new identical chemical group, namely the amide group.

Figure 5A:
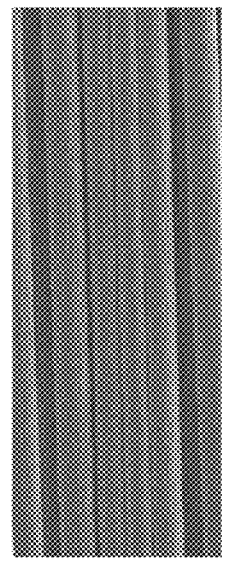
FIGS. 5(A) and 5(B) shows SEM surface morphology images of CF before and after modification.
Figure 5B:
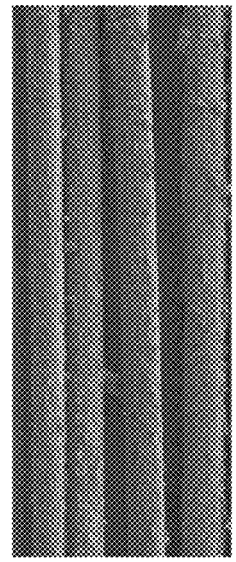

(2) SEM Microscopic Images:

FIG. 5(a) shows that the surface of the untreated carbon fiber is smooth and clean. FIG. 5(b) shows a surface morphology image of the CF after oxidation with an acidic potassium permanganate solution, the roughness is obviously improved, and the surface has a certain degree of etching marks, indicating that the surface of the carbon fiber after soaking in the acidic potassium permanganate solution is slightly damaged, and the friction between the resin and the fiber is increased to a certain extent by physical modification.

Figure 6A:
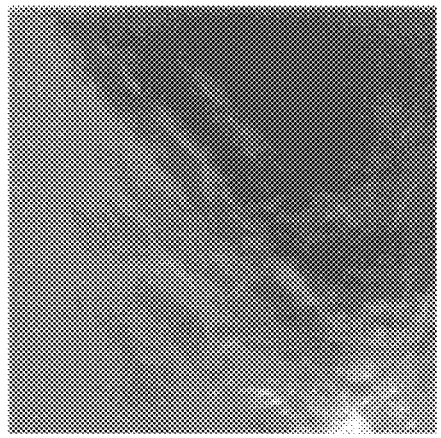
FIGS. 6(A) and 6(B) shows SEM surface morphology images of PMMA before and after modification.
Figure 6B:
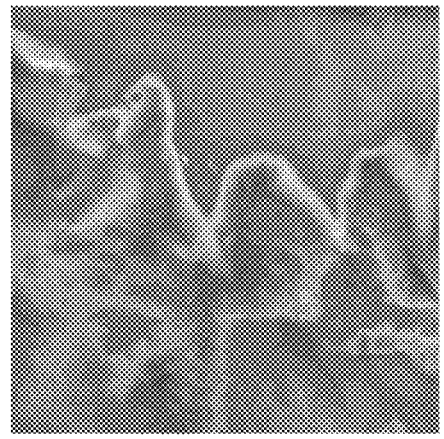
Figure 7:
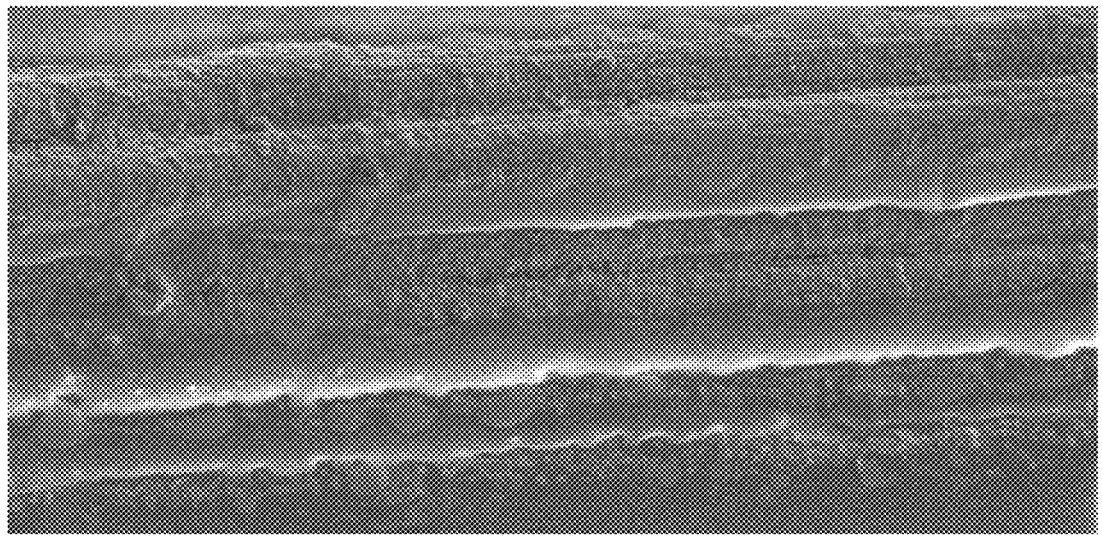
FIG. 7 shows an SEM surface morphology image of modified CF after HDI is brush-coated.
Figure 8:
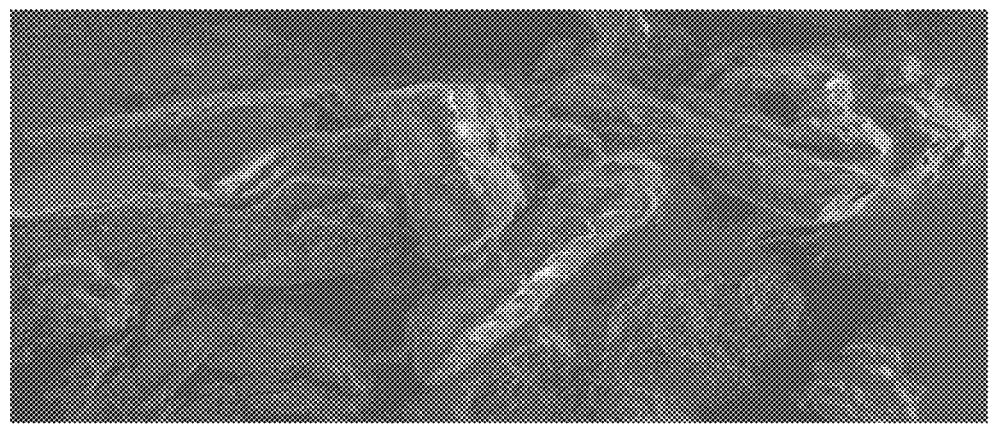
FIG. 8 shows an SEM surface morphology image of modified PMMA after HDI is brush-coated.

FIG. 6(a) and FIG. 6(b) show the surface micro-morphology of the PMMA before and after hydrolysis treatment. After the treatment, the surface becomes rough and has obvious etching marks. FIG. 7 and FIG. 8 show the surface micro-morphology of the modified CF and PMMA after HDI is brush-coated, respectively. From the figures, it can be seen that the HDI is tightly attached to the surfaces of the two materials. According to analysis of the infrared spectra, it can be determined that a chemical connection bond is formed between the CF and the PMMA under the action of the HDI.

Figure 9:
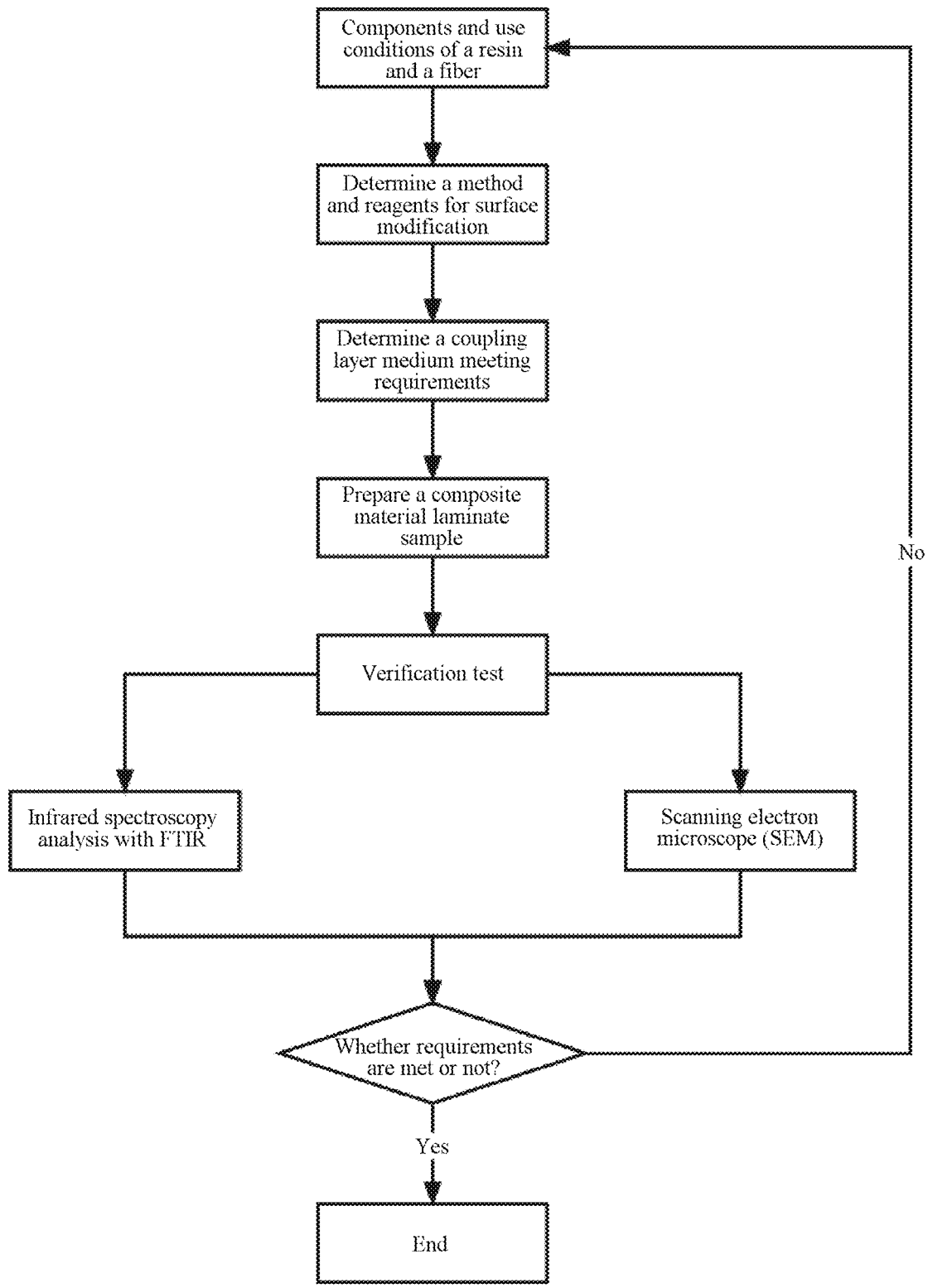
FIG. 9 is a flowchart showing a process for improving an interface bonding property of CF/PMMA.

The present disclosure provides a whole set of a flowchart showing improvement of mechanical properties of an interface of a carbon fiber reinforced polymethyl methacrylate composite material by using hexamethylene diisocyanate, as shown in FIG. 9, and a carbon fiber thermoplastic resin matrix composite material sample is successfully manufactured according to the flow. The composite material has an excellent interface bonding property.

What is claimed is:

1. A method for modifying an interface of a carbon fiber reinforced thermoplastic resin matrix composite material, comprising:

(1) preparing an acidic potassium permanganate solution, immersing a cleaned carbon fiber in the prepared acidic potassium permanganate solution for soaking for a set time, and taking out the carbon fiber, followed by cleaning, drying, sealing and preservation for later use;

(2) brush-coating a surface of a cleaned polymethyl methacrylate film sheet with tetrahydrofuran, conducting sealing and standing, taking out the film sheet, then soaking the film sheet in a diluted hydrochloric acid solution for a set time, and after the treatment is completed, taking out the film sheet, followed by drying, sealing and preservation for later use;

(3) cutting the treated polymethyl methacrylate film sheet and carbon fiber in appropriate sizes according to the size of a mold;

(4) coating surfaces of the treated and cut fiber and resin film with a layer of hexamethylene diisocyanate, and after uniform coating is completed, conducting laying according to a designed laying sequence to form a preformed body, where outermost layers on the upper and lower surfaces of the preformed body are resin film sheets;

(5) laying a release cloth on the upper and lower surfaces of the preformed body, and then placing the preformed body in a vacuum bag for vacuumization treatment; and (6) placing the vacuumized and treated preformed body of the composite material in the forming mold of a press machine at a set temperature and a set pressure, conducting hot pressing for a set time, taking out the mold, placing the mold on a worktable for cooling, and after cooling to room temperature, opening the release cloth to obtain a modified carbon fiber reinforced polymethyl methacrylate composite material sample.

2. The method for modifying an interface of a carbon fiber reinforced thermoplastic resin matrix composite material according to claim 1, wherein in step (1), the acidic potassium permanganate solution has a mass fraction of 5-30% and is prepared by adding deionized water and an appropriate amount of a mixed solution of diluted hydrochloric acid with a concentration of 0.01-1 mol/L.

3. The method for modifying an interface of a carbon fiber reinforced thermoplastic resin matrix composite material according to claim 1, wherein in step (1), the soaking process is carried out in an ultrasonic cleaner under a water bath at a temperature of 10-60° C.

4. The method for modifying an interface of a carbon fiber reinforced thermoplastic resin matrix composite material according to claim 1, wherein a method for cleaning and drying the carbon fiber comprises cleaning the surface of the carbon fiber with deionized water for four times, and placing the cleaned carbon fiber in a preheated oven for drying for a set time.

5. The method for modifying an interface of a carbon fiber reinforced thermoplastic resin matrix composite material according to claim 1, wherein in step (2), as the polymethyl methacrylate is capable of being dissolved in the tetrahydrofuran, the film sheet better undergoes a hydrolysis reaction with the hydrochloric acid to produce a polar carboxyl group after the surface is partially dissolved.

6. The method for modifying an interface of a carbon fiber reinforced thermoplastic resin matrix composite material according to claim 1, wherein in step (2), the concentration of the hydrochloric acid solution used is 0.01-1 mol/L.

7. The method for modifying an interface of a carbon fiber reinforced thermoplastic resin matrix composite material according to claim 1, wherein in step (2), the soaking process is carried out in an oven at a temperature of 10-60° C.

8. The method for modifying an interface of a carbon fiber reinforced thermoplastic resin matrix composite material according to claim 1, wherein in step (4), as two ends of a hexamethylene diisocyanate molecule have polar —NCO groups which can undergo chemical reactions with carboxyl groups on the fiber and the resin respectively, the two materials are better connected to realize chemical grafting.

* * * * *